United States Patent [19]

Grande

[11] 4,211,076
[45] Jul. 8, 1980

[54] ENERGY CONVERTION ENGINE

[76] Inventor: Magnar J. Grande, P.O. Box 491, Metairie, La. 70004

[21] Appl. No.: 917,099

[22] Filed: Jun. 19, 1978

[51] Int. Cl.² .......................... F03B 13/12; E01H 5/02
[52] U.S. Cl. ....................................... 60/398; 290/54; 405/75; 417/334; 415/5
[58] Field of Search ................. 60/325, 327, 371, 398, 60/407, 495, 639; 290/43, 54; 405/75; 417/90, 108, 320, 332, 334, 337; 415/5

[56] References Cited

U.S. PATENT DOCUMENTS

| 248,619 | 10/1881 | Smith | 417/334 |
|---|---|---|---|
| 806,104 | 12/1905 | Burkhard | 417/108 |
| 4,110,980 | 9/1978 | Foulke | 60/398 X |

*Primary Examiner*—Edgar W. Geoghegan
*Attorney, Agent, or Firm*—Calvin J. Laiche

[57] ABSTRACT

The present invention provides a new method of obtaining energy without using fuels. Basically the device consists of a conveyor belt that contains a continuous arrangement of cells or pockets that are open in the outward direction perpendicular to it's motion. The conveyor belt is set in motion by the effect of natural water flow or currents upon the hinged flaps that are attached to it. The cells when pointed in a downward direction, will carry air down to great depths and release the air at the point at which the belt turns beneath the water and when the cells are pointed in an upward direction. This highly compressed air can then be captured in a container and the stored energy thusly obtained can be used by gradually releasing it for the purpose of driving a turbine wheel.

5 Claims, 2 Drawing Figures

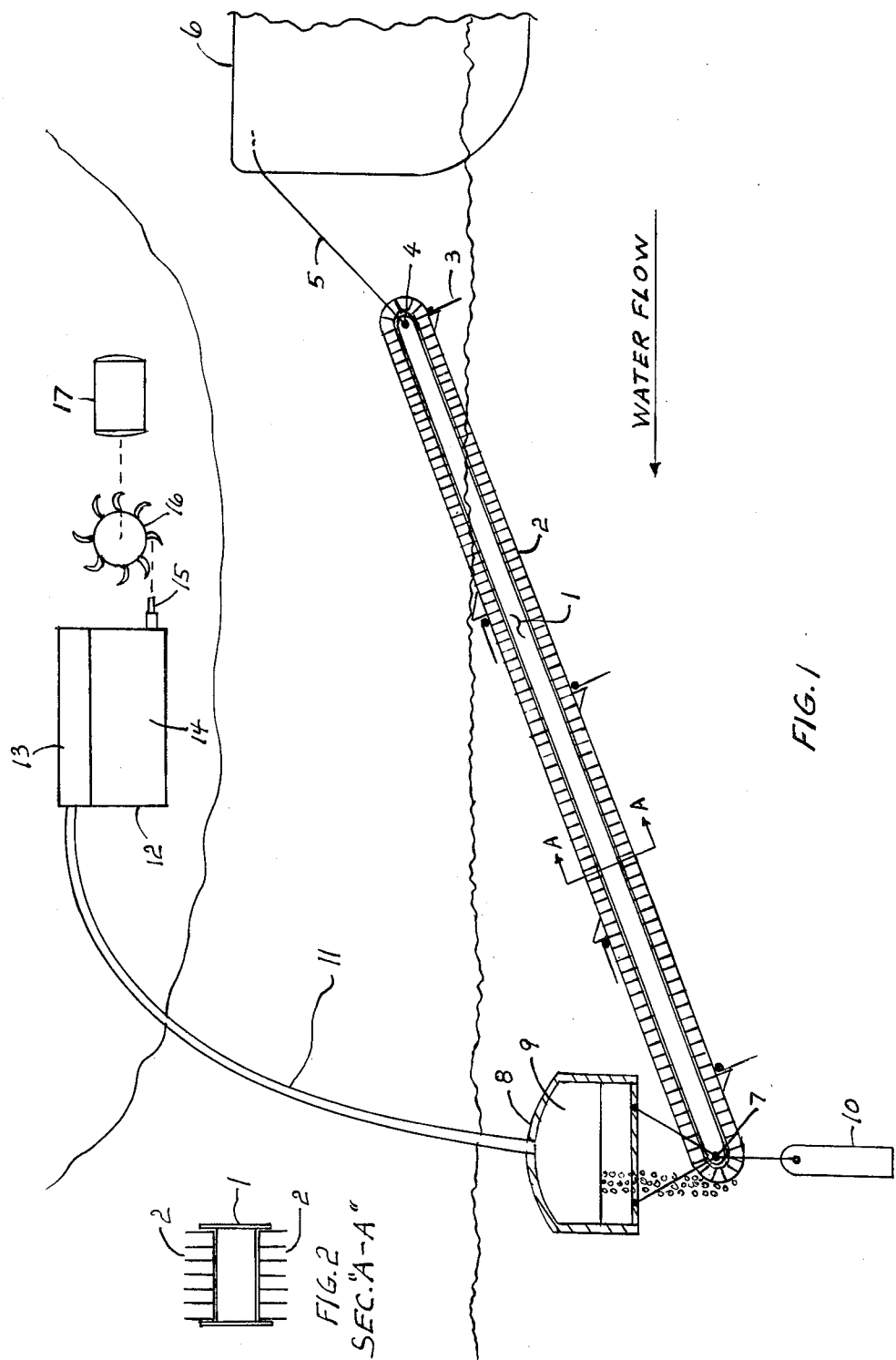

ENERGY CONVERTION ENGINE

BACKGROUND OF THE INVENTION

The instant Invention relates to means and methods of converting available sources of energy to practical usable forms. These available forms of energy are found in oceans and in rivers. There are two components of energy available in our oceans and rivers, and those are the weight of the water and the motion (flow) of the water. A specially designed open cell conveyor belt, driven by the water flow, can be used to bring air from the surface of a body of water down to great depths. The air can then be released and accumulated in containers, under high pressure at depths of several hundred or several thousand feet. This high air pressure can now be brought to shore through flexible tubing and again accumulated in containers as a form of stored energy. These containers can also be partially filled with water or mercury that can be released through a nozzle, thus driving a turbine wheel coupled to an electrical generator.

It can now be understood that the pressure representing the stored energy at say 1000 feet of depth is equal to the stored energy of a body of water at an altitude of 1000 feet above sea level, exept that the quantity of energy in a body of water is limited by the environmental conditions, while the quantity of energy from an air pressure container is limited only by it's design configurations.

It is obvious then that this source of energy is unlimited. Alternatively, a solid chemical compound such as a carbide, that changes to gaseous form when mixed with water, can be carried by the conveyor, released at great depths and accumulated in the container under high pressure. Another alternative is to use known methods of electrolysis at great depths that will result in the release of oxygen and hydrogen from the water. The gases can again be captured and accumulated in containers under high pressure and then be utilized in the same manner as compressed air.

DESCRIPTION OF DRAWING

The above object, together with it's described features of the instant invention, will be apparent to one who is skilled in the art, and in light of the details of construction and operation of the "Energy Conversion Engine" as shown in the drawing and described in the ensuing detailed disclosure.

In the drawing, illustrating the preferred embodiment of the present invention, reference numerals are employed throughout.

FIG. 1 in the drawing depicts a side elevational view of the "Energy Conversion Engine" as shown in the most typical installation.

FIG. 2 in the drawing represents a cross sectional view, taken along the line "A—A" of FIG. 1.

DESCRIPTION OF A PREFERRED EMBODIMENT

Referring to FIGS. 1 and 2 of the drawing, the present invention "Energy Conversion Engine" basically comprises a free floating conveyor guide 1, a conveyor belt 2, a hinged propeller flap 3, a pivot point 4, a cable 5, an anchored barge 6, a pivot point 7, an open bottom container 8, compressed air or gas 9 therein, a weight 10, a flexible tubing 11, a tank or arrangement of tanks 12, having therein compressed air or gas 13, and water or mercury 14, a nozzle 15, a turbine wheel 16, and an electrical generator or driven machinery 17.

What I claim as my invention is:

1. Fuelless means of obtaining energy comprising:
   (a) Cellular conveyor means for carrying air at atmospheric pressure down to great water depths and converting it to stored energy in the form of compressed air;
   (b) Open bottom bell type container means for capturing the compressed air; and
   (c) Means for converting the stored energy to practical use by driving a turbine wheel through the use of a pressure container and a nozzle arrangement.

2. Energy conversion means comprising:
   (a) Cellular conveyor means comprising a multitude of pockets continually arranged upon flexible conveyor belt means, said pockets being open in the outward direction perpendicular to the path of travel of said conveyor means when one end of said conveyor means is submerged in a body of water and its other end is in open communication with the atmosphere, said conveyor means being further defined as comprising a multitude of hinged propeller flaps mounted thereon which hand downward in a direction essentially perpendicular to the path of travel of said conveyor means when said propeller flaps are positioned underneath said conveyor means and in a position essentially parallel to the path of travel of said conveyor means when said flaps are rotated and positioned on the topside of said conveyor means such that when said conveyor means is positioned in a body of water in the direction inclined toward the current flow of the body of water, the movement of the body of water upon striking said propeller flaps thereby pushes upon said propeller flaps and causes said conveyor means to rotate, each propeller flap on the bottom side of said conveyor means upon contact with the current flow exerts a forward thrust action upon said conveyor belt and upon its return on the topside of said conveyor means is shoved downward essentially parallel to said conveyor belt means to offer essentially no resistance to water flowing thereover, in which manner air at the atmospheric end of said conveyor means enters each of said air pockets and upon said air pockets being rotated on the bottom side of said conveyor means beneath the water level is thereby compressed and upon each of said air pockets changing direction at the lower end of said conveyor means, air compressed therein is released which thereby bubbles upward; and
   (b) Compressed air entrapment means for entrapping the compressed air released from the lower submerged end of said conveyor means.

3. The energy conversion means of claim 3 further characterized in that: said conveyor means is further defined as comprising a lower pivot point and an upper pivot point over which said conveyor belt rotates, said lower pivot point during operation being submerged in a body of water and said upper pivot point during operation being positioned in a source of atmospheric air.

4. The energy conversion means of claim 3 further characterized in that: said compressed air entrapment means comprises an open bottom bell type of container having an outlet at its top portion connected to flexible conduit means extending to an elevated point.

5. The energy conversion means of claim 4 further defined as comprising:
(c) Energy conversion means for converting the source of compressed air to some practical use, said energy conversion means comprising a compressed air container means operably connected to said compressed air entrapment means, nozzle means in open communication with said pressure container means, and turbine means defining a turbine wheel positioned in close proximity to said nozzle means such that compressed air collected in said compressed air entrapment means upon flowing to said pressure container means and exiting through said nozzle means impinges upon said turbine wheel means thereby causing it to rotate, said turbine wheel means being further defined as comprising a power transmission unit for imparting the energy derived through its circular motion to said power transmission means.

* * * * *